Feb. 4, 1958   C. R. MAYO ET AL   2,822,172
SHEET HANDLING MACHINE

Filed Jan. 6, 1955   4 Sheets-Sheet 1

Inventors
CLYDE R. MAYO
AMERICO J. CERASANI by Frank A. Steinkilper
Att'y

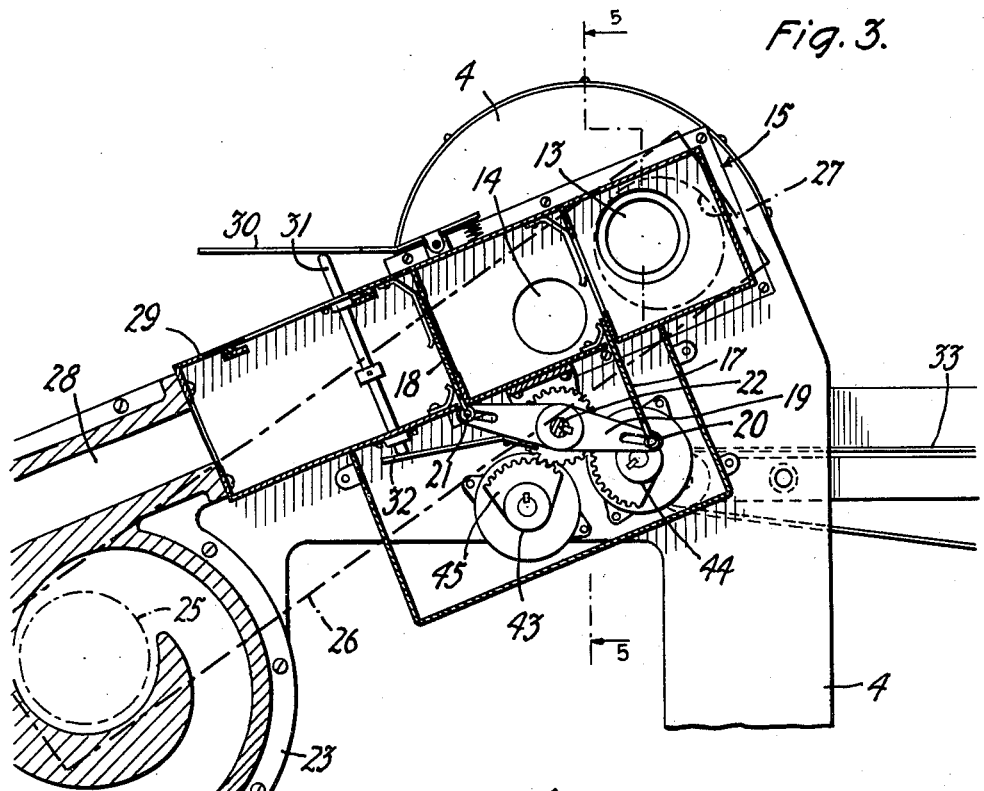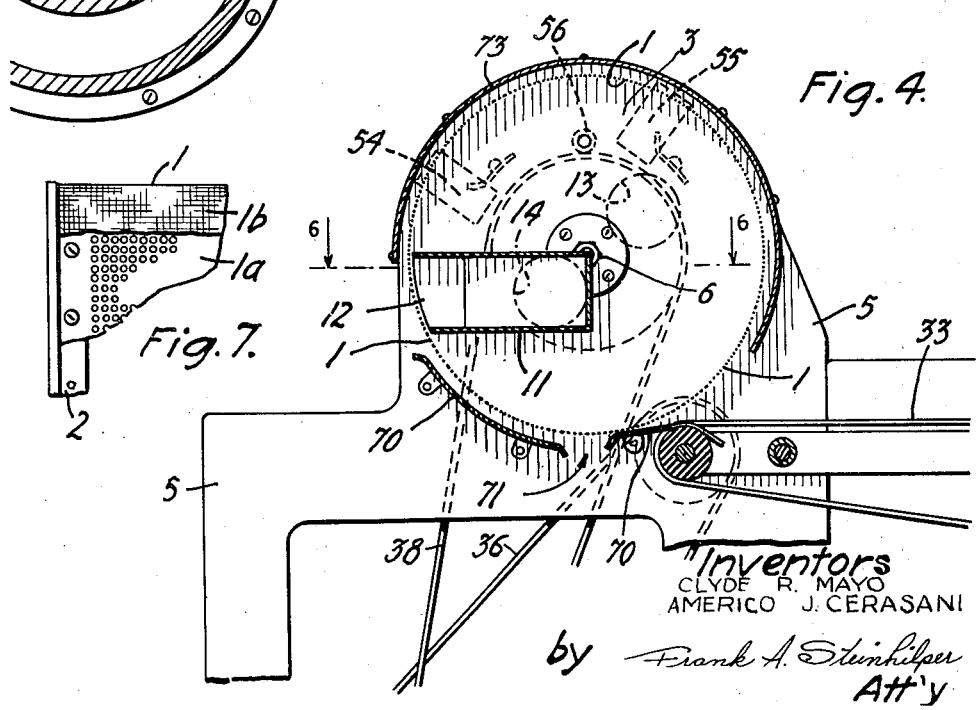

Feb. 4, 1958

C. R. MAYO ET AL 2,822,172

SHEET HANDLING MACHINE

Filed Jan. 6, 1955

4 Sheets-Sheet 3

Inventors
CLYDE R. MAYO
AMERICO J. CERASANI by Frank A. Steinhilper
Att'y

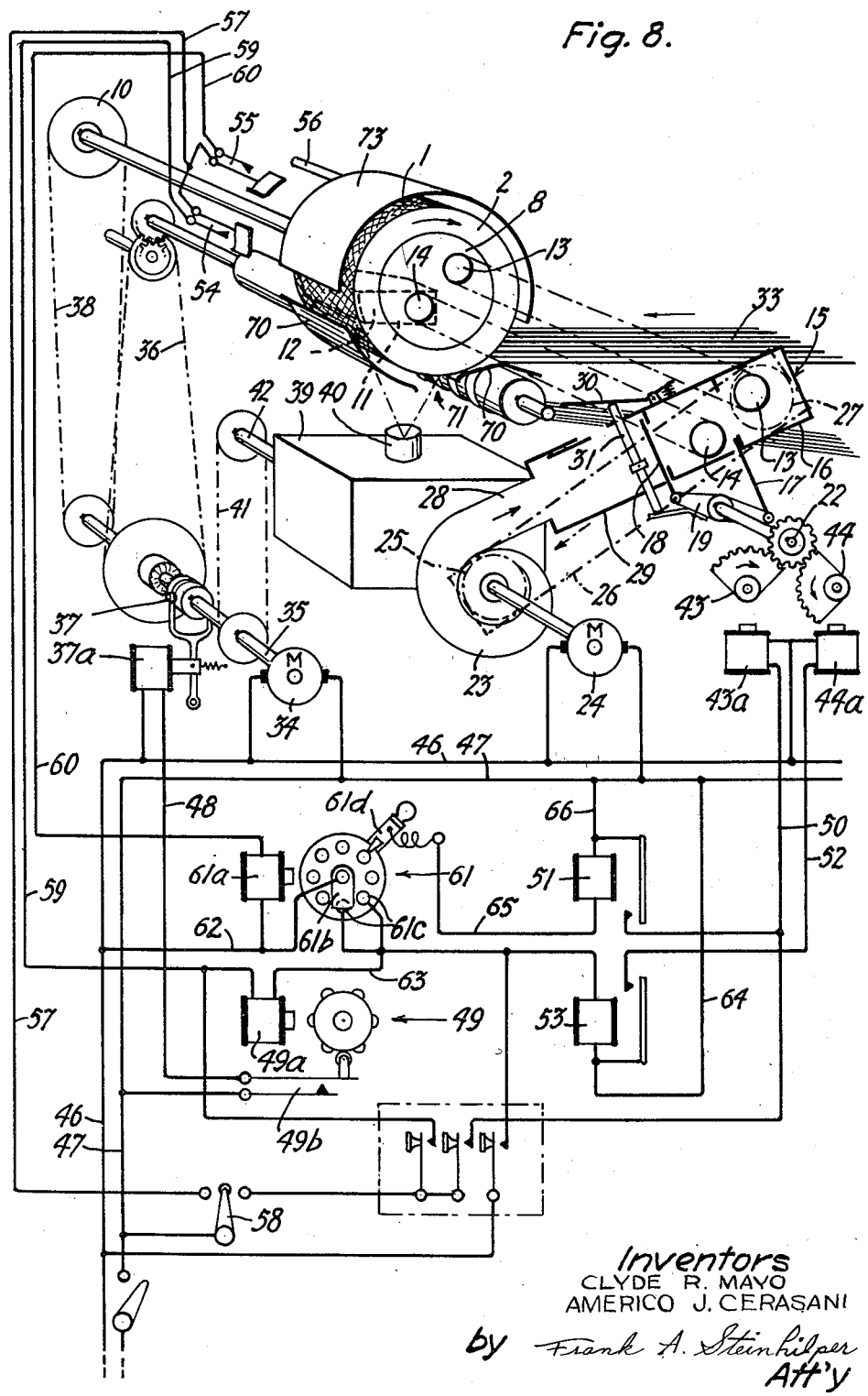

United States Patent Office 2,822,172
Patented Feb. 4, 1958

2,822,172

SHEET HANDLING MACHINE

Clyde R. Mayo and Americo J. Cerasani, Rochester, N. Y., assignors to The Haloid Company, Rochester, N. Y., a corporation of New York Application January 6, 1955, Serial No. 480,081

8 Claims. (Cl. 271—74)

This invention relates to a sheet handling machine which was invented particularly for the purpose of successively exposing paper sheets, such as letters, drawings, etc., in connection with the use of a copying machine capable of working with moving objects. For example, one such copying machine is a xerographic or electrophotographic machine embodying an image drum which rotates continuously and to which the image is projected by a lens, the machine continuously delivering copies of the images projected on the drum. Naturally this requires moving objects travelling at a rate synchronized with the peripheral speed of the drum.

One object of the invention is to provide the described type of machine in a form capable of accepting a plurality of sheets and exposing them in succession either once for each sheet or so as to obtain a plurality of exposures of each sheet, after which the sheets are discharged from the machine. Another object is to provide a machine of this type and which functions in an automatic manner to effect either one or a predeterminable number of exposures of each sheet. Other objects may be inferred from the following.

Figure 1:
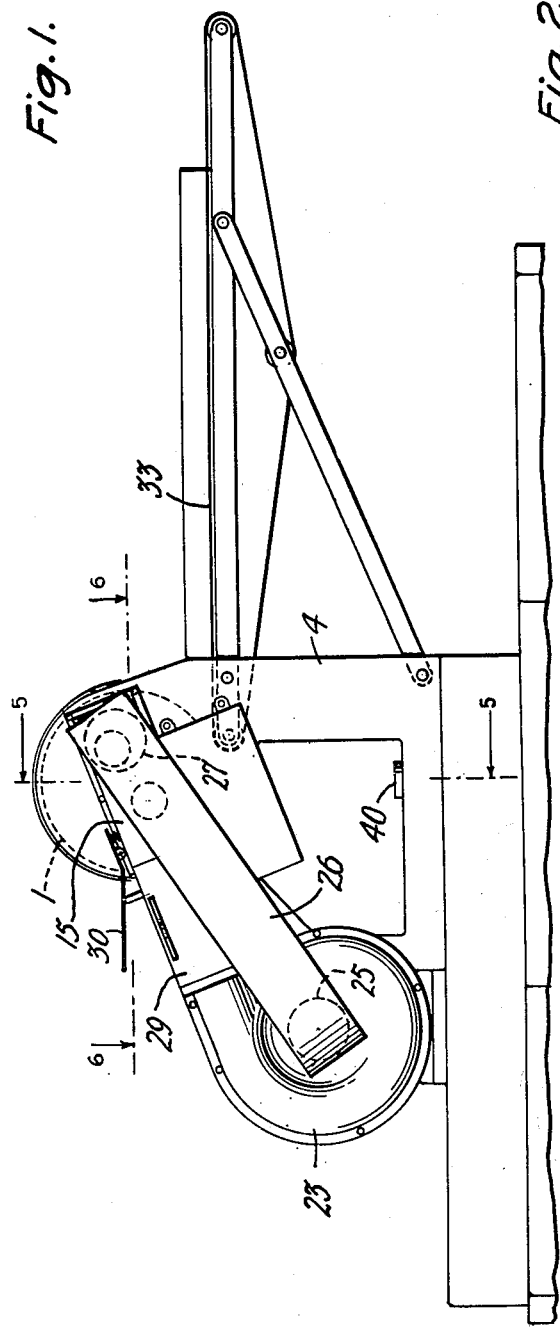
Figure 2:
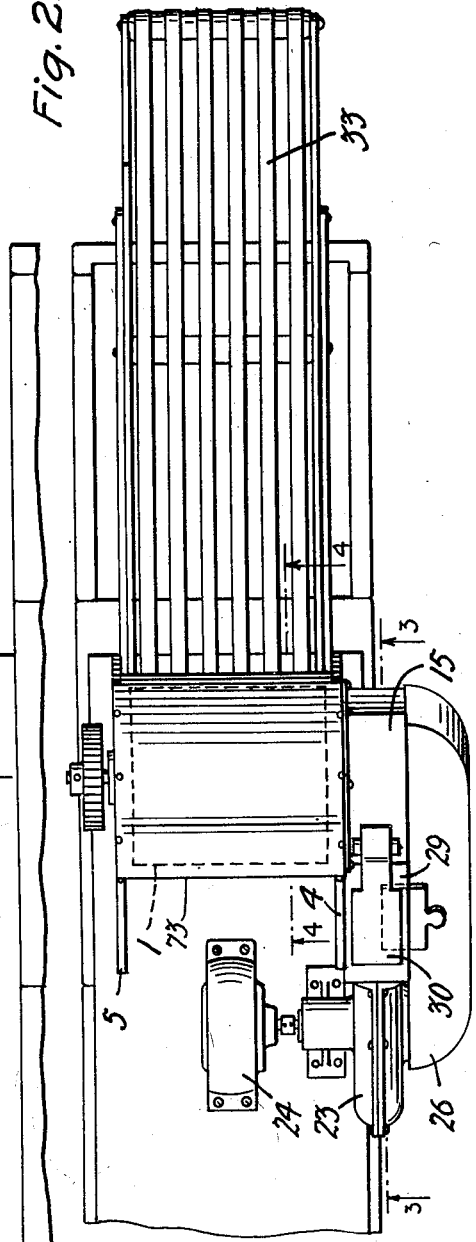
Figure 5:
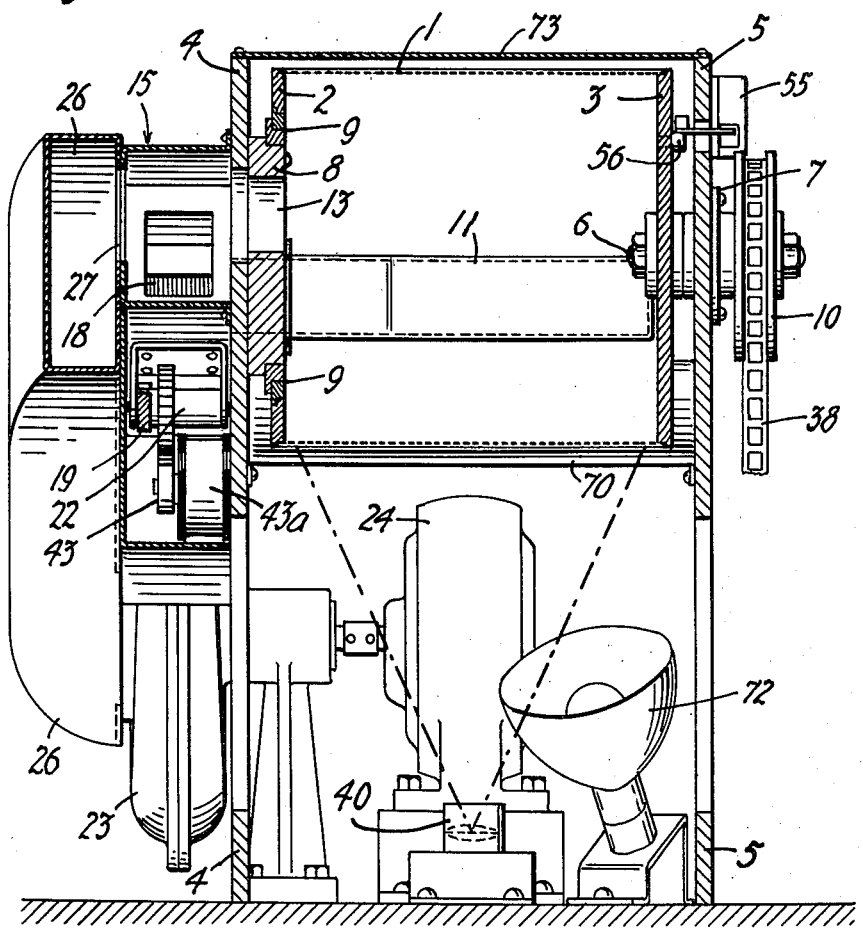
Figure 6:
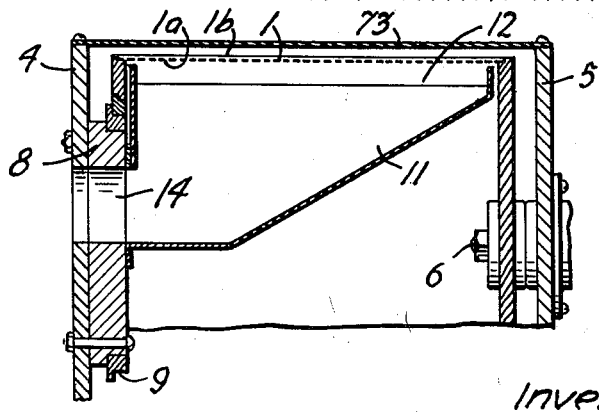

A specific example of a machine embodying the principles of the present invention is illustrated by the accompanying drawings in which:

Fig. 1 is a side elevation;
Fig. 2 is a top plan view;
Fig. 3 is a vertical section taken on the line 3—3 in Fig. 2;
Fig. 4 is a vertical section taken on the line 4—4 in Fig. 2;
Fig. 5 is a vertical cross section taken on the line 5—5 in Fig. 1;
Fig. 6 is a horizontal section taken on the line 6—6 in Fig. 1;
Fig. 7 is a broken away view for the purpose of exposing certain details; and
Fig. 8 schematically shows the main working elements of the machine in perspective, in conjunction with a wiring diagram illustrating the control system.

The illustrated machine incorporates a rotary drum formed by a cylindrical wall 1 and end walls 2 and 3, respectively. The wall 1 is pervious to air flow, Fig. 7 showing that this wall may comprise a perforated metal screen 1a covered by cloth 1b. In most instances paper copy is white and, therefore, the cloth 1b ordinarily is white.

This drum is mounted between two side frames 4 and 5, respectively. The wall 3 is fixed to a shaft assembly 6 which extends through a bearing assembly 7 installed in a hole formed through the side frame 5. This wall 3 is in the form of a disk. The wall 2 is in the form of an annulus which rides on a large diameter hollow bearing assembly 8 which is secured to the side frame 4, the inner periphery of the wall 2 and this bearing assembly 8 being provided with a sliding seal assembly 9. The bearing assembly 8 is stationary; it does not rotate with the drum elements 1, 2 and 3. However, the shaft 6 is locked to the wall 3 and has an outer end to which a sprocket wheel 10 is locked, whereby to provide an arrangement for driving the drum rotatively.

As shown by Fig. 6, in particular, the hollow bearing assembly mounts a nozzle 11 inside of the drum. This nozzle has a mouth 12 which extends for the width of the cylindrical wall 1, this mouth extending circumferentially with respect to the drum wall 1 for but a short distance, as shown by Fig. 4, for example.

Although the bearing assembly 8 has been referred to as being hollow, it is actually so necessarily only in the sense that it has two relatively large ports 13 and 14 formed therethrough, the side frame 4 having corresponding ports. The port 13 connects with the inside of the wall 1, which is otherwise enclosed in a substantially airtight manner by the walls 2 and 3 and the bearing assembly 8, while the port 14 connects with the inside of the nozzle 11. This nozzle is otherwise substantially air-tight with respect to the inside of the wall 1, the nozzle's mouth 12 being located very close to the inside of the wall 1 and, if desired, in actual sliding contact therewith through the medium of a suitable sliding seal, for example.

Referring particularly to Fig. 3, a valve assembly 15 is mounted on the outer surface of the side frame 4 in registration with the ports 13 and 14. This assembly includes an elongated box-like casing 16 which forms a common passage or chamber extending across both ports 13 and 14 and provided with transversely operating sliding valve plates 17 and 18. These valves are interconnected by the opposite ends of a rocker arm 19 through sliding pivot connections 20 and 21, the arm 19 being mounted on a suitably journaled rocker shaft 22.

A relatively large blower 23, powered by a motor 24, is mounted on the outer side of the side frame 4. This blower has a suction inlet 25 which connects through a duct 26 with a port 27 formed in the outer wall of the casing 16 substantially opposite to the port 13. The blower 23 has an exhaust outlet 28 which is connected through a rectangular conduit 29 with the valve casing 16 through the latter's opening controlled by its sliding plate valve 18. The conduit 29 is provided with a relief valve 30 which is pushed open by a push rod 31 worked by an arm 32 secured to the shaft 22 in such a manner that the valve 30 opens whenever the sliding valve plate 18 is closed. Any suitable arrangement for producing the same effect, may be used.

Now it can be seen that with the blower 23 operating and with the valve plate 17 open and the valve plate 18 closed, that the suction inlet of the blower is connected with both of the ports 13 and 14. Therefore, suction exists throughout both the inside of the drum and the inside of the nozzle 11. If a paper sheet is applied to the wall 1 it will be held thereto by the atmospheric pressure and will be carried along therewith, assuming the drum to be rotating. At such times the relief 30 is opened so that the blower may exhaust to atmosphere. Partial turning of the shaft 22 closes the valve plate 17 and opens the valve plate 18, the relief valve 30 then closing. Under such conditions, the suction inlet of the blower is still connected with the port 13 but the port 14 is connected with the exhaust outlet of the blower while being segregated from the inside of the drum by the valve plate 17. Now the blower is exhausting through the nozzle 11 and if a paper sheet is adhering to the wall 1 it will be blown therefrom as soon as it registers with the nozzle's mouth 12. Thus it can be seen that this nozzle mouth 12 establishes a sheet discharge location which, as is shown by Fig. 4, is oriented generally horizontally with respect to the machine as a whole.

Figs. 1 and 2 show an endless belt type conveyor 33 arranged horizontally so as to feed sheets to the wall 1 adjacent to its bottom and on one side of the above mentioned discharge location. This belt conveyor may be of any type but preferably has a length substantially equalling or somewhat exceeding the circumference of the cylindrical wall 1. This permits a succession of paper sheets to be laid on the conveyor sufficient to fill the entire circumference of the wall 1.

Referring to Fig. 8, a motor 34 powers a drive shaft 35, these parts being connected by suitable standards and the like and otherwise organized with the parts already described so as to provide an integrated machine. Schematically, the drive shaft 35 is shown driving the belt conveyor 33 through a chain drive 36 controlled by a solenoid actuated clutch 37. The shaft 35 is also connected to the sprocket wheel 10, of the drum's shaft assembly 8, by a chain drive 38. The described type of copying equipment is shown at 39 with its lens 40 pointing toward and encompassing the sheet-carrying width of the wall 1 and a short portion of its circumference at its bottom location. A sprocket chain drive 41 is shown between the shaft 35 and a shaft 42 projecting from the equipment 39, to show that the electrophotographic image plate cylinder, of the equipment 39, is synchronized with the rotation of the wall 1.

The shaft 22, of the previously described valve assembly equipment, may be turned in one direction or another by either of two solenoid actuated devices 43 and 44 which are geared to the shaft 22 by gearing 45. These devices are commercially available in a form physically smaller than is indicated by Fig. 3, but if so illustrated they would not be exposed to view so well. Any arrangement might be used whereby to throw the shaft 22 to either of its operating extremes.

Returning to Fig. 8, the clutch 37 has an operating solenoid 37a and each of the devices 43 and 44 has an operating solenoid 43a and 44a, respectively. The motors 24 and 34 are electric and are connected to electric power lines 46 and 47. The solenoid 37a is connected to the line 46 and through a branch line 48 with the line 47, the line 48 going through the contacts of a ratchet relay 49. The solenoid 43a is connected to the line 46 and through a branch line 50 with the line 47, the line 50 going through the normally open contacts of a relay 51. The solenoid 44a is likewise connected to the line 46 and, through a branch line 52 with the line 47, the line 52 going through the normally open contacts of a relay 53. When energized the solenoid 43a operates the valve assembly 15 so as to close the valve plate 17 and open the valve plate 18, the solenoid 44a, when energized, effecting the opposite action so that the nozzle 11 is caused to exert its sucking action.

Micro-limit switches 54 and 55, respectively, are located adjacent to the drum having the cylindrical wall 1 and which mounts an operator 56 for these switches. Each time the drum revolves once these switches are operated once in succession. Both are of the normally open type and each is connected with the line 47 through a common line 57 which goes through a double-pole switch 58 having a central off position. The motor 34 runs continuously during the normal operation of the machine, and throwing the switch 58 so as to connect the line 57 to the line 47 activates the machine. The conveyor 33 is not operating at this time because the clutch 37 is disengaged.

As the drum rotates the operator 56 closes the contacts of the switch 54 which is connected through a line 59 with one end of the solenoid 49a of the ratchet relay 49. Shortly thereafter the switch 55 is closed and its contacts are connected through a line 60 with the operating solenoid 61a of a stepping relay 61. The other end of this solenoid 61a is connected by a line 62 with the line 46. The line 62 also connects the moving contactor 61b, of the relay 61, with the line 46 and the first two contacts 61c, of the relay 61, are connected by a line 63 with the end of the relay 49a whose other end connects with the line 59.

Now it is apparent that when the contacts of the switch 54 closed the solenoid 49a was momentarily energized and that the contacts 49b, of the relay 49, closed and will remain closed until 49a is again energized. These contacts 49b control the solenoid 37a so that latter is energized and the clutch 37 is engaged, the conveyor 33, therefore, moving in synchronism with the drum so as to feed any sheets on the conveyor 33 to the drum in the form of a series of successive sheets, it being understood that the sheets may be arranged in this fashion on the conveyor 33. One end of the solenoid 53 also connects with this line 63 and its other end, through a line 64, connects with the line 47, whereby the relay 53 is also activated. Since its contacts control the solenoid 44a the valve plate 17 is opened while the valve plate 18 is closed. It follows that the entire surface of the drum is now under vacuum so that all of the paper sheets may be picked up.

Energization of the solenoid 61a, of the stepping relay 61, advances the latter's contactors 61b one step this keeping the solenoid 49a in circuit with the line 46 so that when the switch 54 is again closed by the drum starting to turn through its second revolution the solenoid 49a is again energized so as to open the contacts 49b and thus de-energize the solenoid 37a and disengage the clutch 37 so that the conveyor 33 stops travelling.

The selector contact 61d, of the stepping relay 61, is set at any one of the contacts 61c representing any desired count of the number of drum revolutions. Each time the drum revolves the paper sheets are exposed to the lens 40 and the contactor 61b advances another step. When the contactor 61b reaches the contact selected by the selector 61d the solenoid of the relay 51 is actuated because it is connected with the selector 61d by a line 65 and with the line 47 by a line 66. The solenoid of the relay 53 was previously de-energized when the contactor 61b left the second of the contacts 61c. Under the control of the relay 51 the solenoid 43a is energized so that the valve plate 17 is closed and the valve plate 18 is opened along with the relief valve 30, this connecting the nozzle 11 with the exhaust outlet of the blower so that the various sheets are blown off successively as they pass the blower's mouth.

An arrangement for manual control is provided but it is not considered necessary to describe this in detail although it is illustrated by Fig. 8. The manual operation is considered to be obvious.

It can now be seen that by selecting the selector 61d the various sheets fed to the drum are automatically carried past the lens 40 in succession any desired number of times and are then successively discharged from the machine.

As shown by Fig. 4 guides 70 may be arranged to define an exposure or scanning location 71 through which the sheets are exposed. Suitable flood lamps 72 may be arranged to illuminate this area. Preferably the drum is enclosed by a stationary cylindrical shield 73 which terminates just above a location level with the top of the mouth 12 of the nozzle 11, one of the guides 70 terminating just below the level of the bottom of this mouth 12. Various other features may, of course, be incorporated in various commercial versions of the present invention.

We claim:

1. A sheet handling machine including a travelling endless wall formed of a foraminous material, means for reducing the air pressure on one side of said wall to below atmospheric pressure so that sheets applied to the other side thereof are held thereon by atmospheric pressure, and means for forcing air at superatmospheric pressure through a localized portion of said wall towards said other side at a stationary location so as to discharge the sheets from the wall at this location, the area of said localized portion of said wall being substantially less than the area of the entire wall, and counting means for rendering said air forcing means inoperative while said wall travels completely through any given stationary location for a predetermined number of times and to thereafter place said air forcing means in operation.

2. A sheet exposure machine including an endless wall that is pervious to air flow and having an inner side and an outer side, means for causing said wall to travel through an endless path with its outer side passing successively through interspaced sheet exposure and discharge locations, an enclosure for the inner side of said wall, the outer side of said wall being exposed to the atmosphere, stationary nozzle means located within said enclosure and having a mouth pointing towards said discharge location and positioned adjacent to the inner side of said wall, said nozzle mouth subtending a wall area substantially less than the entire wall area, controllable means for alternatively connecting said nozzle in flow communication with the inside of said enclosure or with a source of air under pressure greater than atmospheric, and means for maintaining said enclosure evacuated to a pressure less than atmospheric pressure.

3. A sheet exposure machine including an endless wall that is pervious to air flow and having an inner side and an outer side, means for causing said wall to travel through an endless path with its outer side passing successively through interspaced sheet exposure and discharge locations, an enclosure for the inner side of said wall, the outer side of said wall being exposed to the atmosphere, stationary nozzle means located within said enclosure and having a mouth pointing towards said discharge location and positioned adjacent to the inner side of said wall, said nozzle mouth subtending a wall area substantially less than the entire wall area, controllable means for alternatively connecting said nozzle in flow communication with the inside of said enclosure or with a source of air under pressure greater than atmospheric, and means for maintaining said enclosure evacuated to a pressure less than atmospheric pressure, and means for counting the number of times said wall travels through said path and for operating said controllable means to connect said nozzle with said source of air under pressure automatically upon counting to a predetermined number.

4. A sheet exposure machine including an endless wall that is pervious to air flow and having an inner side and an outer side, means for causing said wall to travel through an endless path with its outer side passing successively through interspaced sheet exposure and discharge locations, an enclosure for the inner side of said wall, the outer side of said wall being exposed to the atmosphere, stationary nozzle means located within said enclosure and having a mouth pointing towards said discharge location and positioned adjacent to the inner side of said wall, said nozzle mouth subtending a wall area substantially less than the entire wall area, controllable means for alternatively connecting said nozzle in flow communication with the inside of said enclosure or with a source of air under pressure greater than atmospheric, and means for maintaining said enclosure evacuated to a pressure less than atmospheric pressure, and means for counting the number of times said wall travels through said path and for operating said controllable means to connect said nozzle with said source of air under pressure automatically upon counting to a predetermined number, said machine further including controllable means for automatically feeding a plurality of sheets in succession to said wall for adherence thereto by atmospheric pressure in series arrangement, and means automatically responsive to the travel of said wall for de-activating said feeding means after said wall travels initially once through said path.

5. A sheet exposure machine including an endless wall that is pervious to air flow and having an inner side and an outer side, means for causing said wall to travel through an endless path with its outer side passing successively through interspaced sheet exposure and discharge locations, an enclosure for the inner side of said wall, the outer side of said wall being exposed to the atmosphere, stationary nozzle means located within said enclosure and having a mouth pointing towards said discharge location and positioned adjacent to the inner side of said wall, said nozzle mouth subtending a wall area substantially less than the entire wall area, a blower having a suction inlet and an exhaust outlet, said inlet being connected in flow communication with said enclosure, and valve means for alternately connecting said nozzle in flow communication with said inlet or with said outlet.

6. A sheet exposure machine including an endless wall that is pervious to air flow and having an inner side and an outer side, means for causing said wall to travel through an endless path with its outer side passing successively through interspaced sheet exposure and discharge locations, an enclosure for the inner side of said wall, the outer side of said wall being exposed to the atmosphere, stationary nozzle means located within said enclosure and having a mouth pointing towards said discharge location and positioned adjacent to the inner side of said wall, said nozzle mouth subtending a wall area substantially less than the entire wall area, a blower having a suction inlet and an exhaust outlet, said inlet being connected in flow communication with said enclosure, and valve means for alternatively connecting said nozzle in flow communication with said inlet or with said outlet, and means for connecting said outlet with the atmosphere when said nozzle is connected with said inlet.

7. A sheet handling machine including a cylindrical wall that is pervious to air flow and having end walls, bearing means for rotatively mounting said end walls, one of said bearing means including a stationary portion through which two ports are formed, a nozzle located inside of said cylindrical wall between said end walls and having a mouth located adjacent to the inside of said cylindrical wall and connected to one of said ports in fluid flow communication therewith, said nozzle mouth subtending a portion of said cylindrical wall area substantially less than the entire cylindrical wall area, a blower having an exhaust outlet connected to said port which is connected to said nozzle and having a suction inlet connected to the other of said ports, and valve means for interconnecting said ports for fluid flow therebetween while closing said port connected to said nozzle from communication with said exhaust outlet, or, alternatively closing said ports off from each other so that said blower sucks from the inside of said cylindrical wall while blowing through said nozzle.

8. A sheet exposure machine including a rotary drum having a cylindrical wall which is pervious to air flow, a nozzle located inside of said drum with a mouth pointing towards the inside of said wall, said nozzle mouth subtending a wall area substantially less than the entire wall area, a blower having an inlet and an outlet, means including a valve assembly for connecting both said drum and said nozzle to said inlet or alternately for connecting said inlet to said drum and said outlet to said nozzle, a conveyor leading to said drum for carrying a series of sheets thereto, automatic means for causing said conveyor to operate and said drum to turn through one revolution and to thereafter de-activate said conveyor, and automatic means for counting the revolutions of said drum and upon counting a predetermined number shifting said valve assembly so as to connect said outlet to said nozzle so as to blow off the sheets.

References Cited in the file of this patent

UNITED STATES PATENTS

| | | |
|---|---|---|
| 1,328,733 | Harriss | Jan. 20, 1920 |
| 1,618,632 | Belluche | Feb. 22, 1927 |
| 2,002,321 | Kluitmann | May 21, 1935 |
| 2,069,397 | Von Barth | Feb. 2, 1937 |
| 2,486,196 | Nebolsine | Oct. 25, 1949 |
| 2,600,469 | Breuers | June 17, 1952 |
| 2,680,615 | Edgar | June 8, 1954 |